(12) United States Patent
Sidiropoulos et al.

(10) Patent No.: US 11,603,963 B2
(45) Date of Patent: Mar. 14, 2023

(54) STRUCTURAL JOINT OF TWO LOAD CARRYING WALLS OF A PRESSURIZED VESSEL

(71) Applicant: The Boeing Company, Chicago, IL (US)

(72) Inventors: Aristidis Sidiropoulos, Huntington Beach, CA (US); William P. Keith, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/147,383

(22) Filed: Jan. 12, 2021

(65) Prior Publication Data

US 2021/0148511 A1 May 20, 2021

Related U.S. Application Data

(62) Division of application No. 16/242,975, filed on Jan. 8, 2019, now Pat. No. 10,920,932.

(51) Int. Cl.
*F17C 1/04* (2006.01)

(52) U.S. Cl.
CPC ........ *F17C 1/04* (2013.01); *F17C 2201/0109* (2013.01); *F17C 2209/227* (2013.01); *F17C 2209/232* (2013.01); *F17C 2270/0197* (2013.01)

(58) Field of Classification Search
CPC ............... F17C 1/04; F17C 2201/0109; F17C 2209/227; F17C 2209/232; F17C 2270/0197; F17C 2221/012; F17C 2223/0123; F17C 1/00; F17C 2203/0658; F17C 2221/011; F17C 2221/033; F17C 2223/0161; Y02E 60/32; Y02T 50/40; B64C 1/068; B64C 1/069; B64G 1/22
See application file for complete search history.

(56) References Cited

U.S. PATENT DOCUMENTS

| 2,755,216 | A | 7/1956 | Lemons | |
|---|---|---|---|---|
| 7,790,294 | B2 * | 9/2010 | Macguire | B23K 3/06 428/293.1 |
| 8,656,571 | B2 | 2/2014 | Hand | |
| 8,661,644 | B2 | 3/2014 | Hand et al. | |

(Continued)

OTHER PUBLICATIONS

Extended European Search Report concerning EP Patent Application No. 19217360.7 dated May 6, 2020.
(Continued)

*Primary Examiner* — Kareen K Thomas
(74) *Attorney, Agent, or Firm* — Kunzler Bean & Adamson

(57) ABSTRACT

Disclosed herein is a structure that comprises a tank including an outer cylindrical surface and a domed end. The structure also comprises a tank skirt positioned circumferentially around the tank. A wall of the tank and a wall of the tank skirt form two sides of a y-joint between the tank and the tank skirt. The y-joint includes a wedge structure positioned between the tank and the tank skirt. Additionally, a thickness of at least one of the wall of the tank or the wall of the tank skirt forming the y-joint tapers such that the thickness of the at least one of the wall of the tank or the wall of the tank skirt that tapers has a greater thickness at the y-joint than away from the y-joint.

20 Claims, 7 Drawing Sheets

(56) References Cited

U.S. PATENT DOCUMENTS

| | | |
|---|---|---|
| 8,917,809 B2 * | 12/2014 | Nozawa .............. B29D 99/0089 206/443 |
| 8,939,407 B2 | 1/2015 | Robinson et al. |
| 8,974,135 B2 | 3/2015 | Robinson et al. |
| 9,453,293 B2 | 9/2016 | Robinson et al. |
| 2007/0205201 A1 | 9/2007 | Cundiff et al. |
| 2011/0049750 A1 * | 3/2011 | Bechtold ............... B29C 70/545 264/177.1 |
| 2012/0018587 A1 | 1/2012 | Robinson et al. |
| 2012/0084959 A1 | 4/2012 | Hand et al. |
| 2013/0136527 A1 | 5/2013 | Robinson et al. |
| 2016/0288925 A1 | 10/2016 | Robinson et al. |
| 2017/0348954 A1 | 12/2017 | Guzman et al. |

OTHER PUBLICATIONS

Canadian Office Action for CA Patent Application No. 3,062,115 dated Dec. 28, 2022.

* cited by examiner

STRUCTURAL JOINT OF TWO LOAD CARRYING WALLS OF A PRESSURIZED VESSEL

FIELD

This disclosure relates generally to pressurized vessels, and more particularly to designs and manufacturing methods for the structural joint of two load carrying walls of a pressurized vessel.

BACKGROUND

Stress risers, which are potentially structurally detrimental, usually occur at a structural joint between the pressurized wall of a pressure vessel and another load carrying wall of the pressure vessel. Existing solutions for reducing stress risers at such structural joints are mainly applicable to metallic pressure vessels. Solutions that help reduce stress risers in metallic pressure vessels often are ineffective at reducing stress risers in pressure vessels made of composite structures. Moreover, solutions designed to reduce stress risers in composite pressure vessels require expensive, specialized materials. Accordingly, reducing stress risers, in wall junctions of pressurized vessels made of composite materials, in an efficient, simple, and cost-effective manner is difficult.

SUMMARY

The subject matter of the present application has been developed in response to the present state of the art, and in particular, in response to the problems and needs associated with stress risers (stress singularity) that arise at the structural joint (also referred to as y-joint) of a pressure vessel's pressurized wall with another load carrying wall created when the pressure vessel wall is split into two branches; one branch for a pressure retaining dome and a second branch which can interface with another structure. In general, the subject matter of the present application has been developed to provide designs and manufacturing methods for this structural joint of two load carrying walls that overcome at least some of the above-discussed shortcomings of the prior art.

Disclosed herein is a structure that comprises a tank including an outer cylindrical surface and a domed end. The structure also comprises a tank skirt positioned circumferentially around the tank. A wall of the tank and a wall of the tank skirt form two sides of a y-joint between the tank and the tank skirt. The y-joint includes a wedge structure positioned between the tank and the tank skirt. Additionally, a thickness of at least one of the wall of the tank or the wall of the tank skirt forming the y-joint tapers such that the thickness of the at least one of the wall of the tank or the wall of the tank skirt that tapers has a greater thickness at the y-joint than away from the y-joint. The preceding subject matter of this paragraph characterizes example 1 of the present disclosure.

The thickness of the wall of the tank forming the y-joint tapers. The preceding subject matter of this paragraph characterizes example 2 of the present disclosure, wherein example 2 also includes the subject matter according to example 1, above.

A thickness of the wall of the tank forming the y-joint is greater along a length of the y-joint and a length extending beyond each side of the y-joint than further away from the y-joint. The preceding subject matter of this paragraph characterizes example 3 of the present disclosure, wherein example 3 also includes the subject matter according to example 2, above.

The tank comprises a lay-up of plies. A ply drop-off ratio of the lay-up of plies along the y-joint is not less than 30:1. The preceding subject matter of this paragraph characterizes example 4 of the present disclosure, wherein example 4 also includes the subject matter according to example 3, above.

The thickness of the wall of the tank skirt forming the y-joint tapers. The preceding subject matter of this paragraph characterizes example 5 of the present disclosure, wherein example 5 also includes the subject matter according to any one of examples 1-4, above.

A thickness of the wall of the tank skirt forming the y-joint is greater along a length of the y-joint and a length extending beyond each side of the y-joint than further away from the y-joint. The preceding subject matter of this paragraph characterizes example 6 of the present disclosure, wherein example 6 also includes the subject matter according to example 5, above.

A stiffness of the wall of the tank and a stiffness of the wedge structure are substantially the same. The preceding subject matter of this paragraph characterizes example 7 of the present disclosure, wherein example 7 also includes the subject matter according to any one of examples 1-6, above.

The thickness of the wall of the tank forming the y-joint tapers. The thickness of the wall of the tank skirt forming the y-joint tapers. The preceding subject matter of this paragraph characterizes example 8 of the present disclosure, wherein example 8 also includes the subject matter according to any one of examples 1-7, above.

The tank and the wedge structure are constructed from materials from a same family of composite materials in different forms. The tank comprises tape and the wedge structure comprises fabric. The preceding subject matter of this paragraph characterizes example 9 of the present disclosure, wherein example 9 also includes the subject matter according to any one of examples 1-8, above.

The lay-up of the wedge structure is a constructed such that a first fabric ply of the wedge structure is oriented in a different direction to a second fabric ply adjacent to the first fabric ply. The preceding subject matter of this paragraph characterizes example 10 of the present disclosure, wherein example 10 also includes the subject matter according to any one of examples 1-9, above.

The fabric ply nearest the tank is oriented forty-five degrees relative to the axial direction of the tank. The preceding subject matter of this paragraph characterizes example 11 of the present disclosure, wherein example 11 also includes the subject matter according to any one of examples 1-10, above.

The tank is a pressurized vessel. The preceding subject matter of this paragraph characterizes example 12 of the present disclosure, wherein example 12 also includes the subject matter according to any one of examples 1-11, above.

The tank is a composite cryogenic fuel tank. The preceding subject matter of this paragraph characterizes example 13 of the present disclosure, wherein example 13 also includes the subject matter according to any one of examples 1-12, above.

The structure forms part of a spacecraft. The preceding subject matter of this paragraph characterizes example 14 of the present disclosure, wherein example 14 also includes the subject matter according to any one of examples 1-13, above.

Also disclosed herein is a structure within a spacecraft. The structure includes a pressurized tank including an outer cylindrical surface and a domed end. The structure also includes a tank skirt positioned circumferentially around the pressurized tank. A wall of the pressurized tank and a wall of the tank skirt form two sides of a y-joint between the pressurized tank and the tank skirt. The y-joint includes a wedge structure positioned between the pressurized tank and the tank skirt. A thickness of the wall of the pressurized tank forming the y-joint tapers such that the thickness of the wall of the pressurized tank has a greater thickness at the y-joint than away from the y-joint. The wedge structure comprises a lay-up of multiple fabric plies. The lay-up of multiple fabric plies of the wedge structure comprises a first fabric ply and a second fabric ply, oriented in a different direction than the first fabric ply. The preceding subject matter of this paragraph characterizes example 15 of the present disclosure.

The first fabric ply is nearer the pressurized tank than the second fabric ply. The first fabric ply is oriented forty-five degrees relative to an axial direction of the tank. The preceding subject matter of this paragraph characterizes example 16 of the present disclosure, wherein example 16 also includes the subject matter according to example 15, above.

Also disclosed herein is a method that comprises laying-up a wedge structure at a tapered thickness portion of a domed end of the tank after the tank has been cured. The method additionally includes curing the wedge structure after being laid-up at the domed end of the tank. The method also includes laying-up a tank skirt around the wedge structure and the tank, after curing the wedge structure, such that a wall of the tank and a wall of the tank skirt form two sides of a y-joint between the tank and the tank skirt within which the wedge structure is located. The preceding subject matter of this paragraph characterizes example 17 of the present disclosure.

The step of laying-up the wedge structure includes orienting a first fabric ply of the wedge structure in a different direction than a second fabric ply adjacent to the first fabric ply. The preceding subject matter of this paragraph characterizes example 18 of the present disclosure, wherein example 18 also includes the subject matter according to example 17, above.

A fabric ply of the wedge structure nearest the tank is oriented forty-five degrees relative to an axial direction of the tank. The preceding subject matter of this paragraph characterizes example 19 of the present disclosure, wherein example 19 also includes the subject matter according to any one of examples 17 or 18, above.

The laying-up the tank skirt around the wedge structure and the tank further includes tapering a thickness of the tank skirt such that the thickness of the tank skirt is greater at the y-joint than away from the y-joint. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
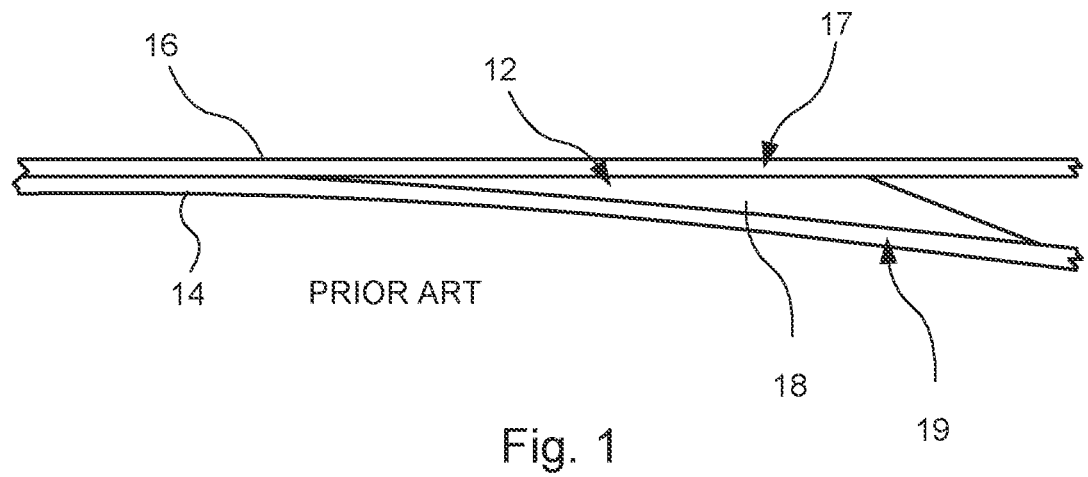
FIG. 1 is a cross-sectional view of a y-joint between a tank and a tank skirt, according to one or more embodiments of the present disclosure.

Referring to FIG. 1, one example of a conventional y-joint 12 between a tank 14 and a tank skirt 16 is shown. The conventional y-joint 12 includes a softening strip 18 between the tank 14 and the tank skirt 16. The softening strip 18 includes a relative stiffness well below the stiffness of the tank 14 or the tank skirt 106 in many instances. As described in more detail below, the y-joint 12 will include stress concentrations. A stress concentration, or stress riser, is susceptible to forming at a first location 19 as well as at a second location 17.

The relative forces that are exerted on the pressurized wall of the tank 14 in conjunction with another load carrying wall of the tank skirt 16 give rise to structurally detrimental stresses (or stress singularities, stress concentrations, or stress risers) at the first location 19 and the second location 17. Some existing solutions to compensate for the stress concentrations in metallic structures include welded or bolted connections. Such solutions are not effective with composite structures. In addition, bolts or welded connections are susceptible to leaking, which can create a dangerous situation if the tank 14 is pressurized and filled with a highly combustible material as is often the case.

As shown in FIG. 1, one existing solution for reducing stress concentrations in composite structures uses special materials in the form of the softening strip 18. In such solutions, a material (usually of some composite preform in case of cryogenic temperatures, or rubber for other temperature ranges) is designed and manufactured to be much softer compared to the stiffness of the adjoining walls of the tank 14 and the tank skirt 16. The objective is to gradually reduce the stresses at the point of stress concentrations of the joint. Such materials are expensive and difficult to develop and manufacture for cryogenic applications. Moreover, rubber-like materials are not applicable to cryogenic applications or may be too soft at other temperature ranges. In addition, the use of softening strips 18 often requires excessive trial and error experimentation because the stiffness (especially in cryogenic temperatures) cannot always be predicted accurately.

Embodiments described herein allow for a more robust and cost efficient design for reducing stress concentrations in the joint between a wall of a pressure vessel and an adjoining load carrying wall (which may be pressurized or not pressurized) compared to conventional techniques. More specifically, embodiments described herein include a third adjoining member at the joint between load carrying walls and/or employ gradual tailoring of the thickness and lay-up of one or both of the load carrying walls.

Figure 2:
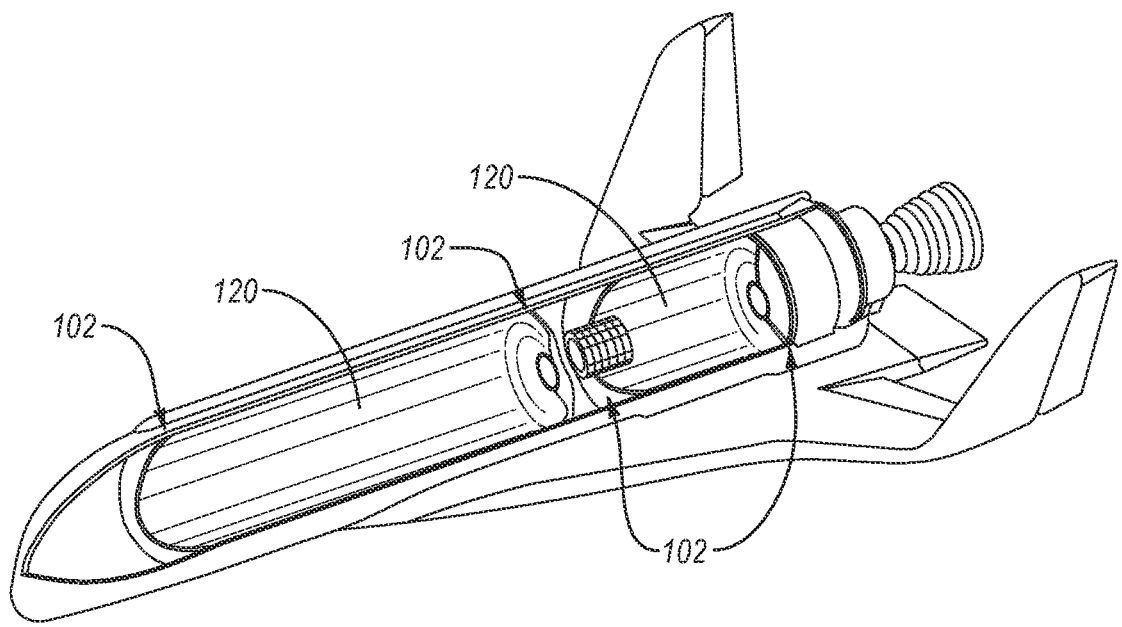
FIG. 2 is an internal side view of a launch vehicle showing locations of y-joints of pressurized vessels, according to one or more embodiments of the present disclosure.
Figure 3:
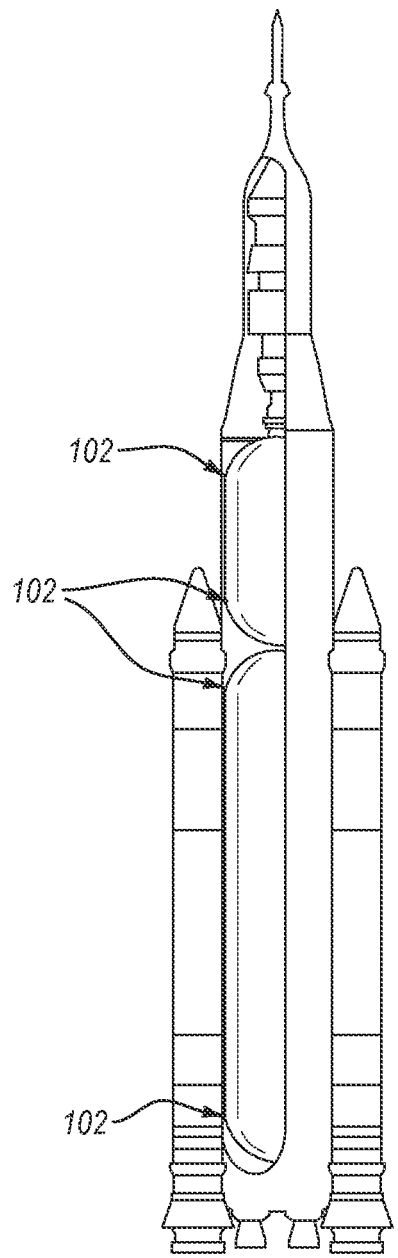
FIG. 3 is an internal perspective view of a launch vehicle showing locations of y-joints of pressurized vessels, according to one or more embodiments of the present disclosure.

Referring to FIGS. 2 and 3, two examples of a spacecraft 101, including various locations of y-joints 102 are shown. In these examples, the y-joints 102 are the joints between domed tanks and tank skirts. The tank skirts may form a structural component, such as an exterior sidewall, of the spacecraft 101. The extreme conditions, including cryogenic conditions, that the spacecraft 101 may be subjected to require proper load sharing between the walls on each side of the y-joints 102.

Figure 4:
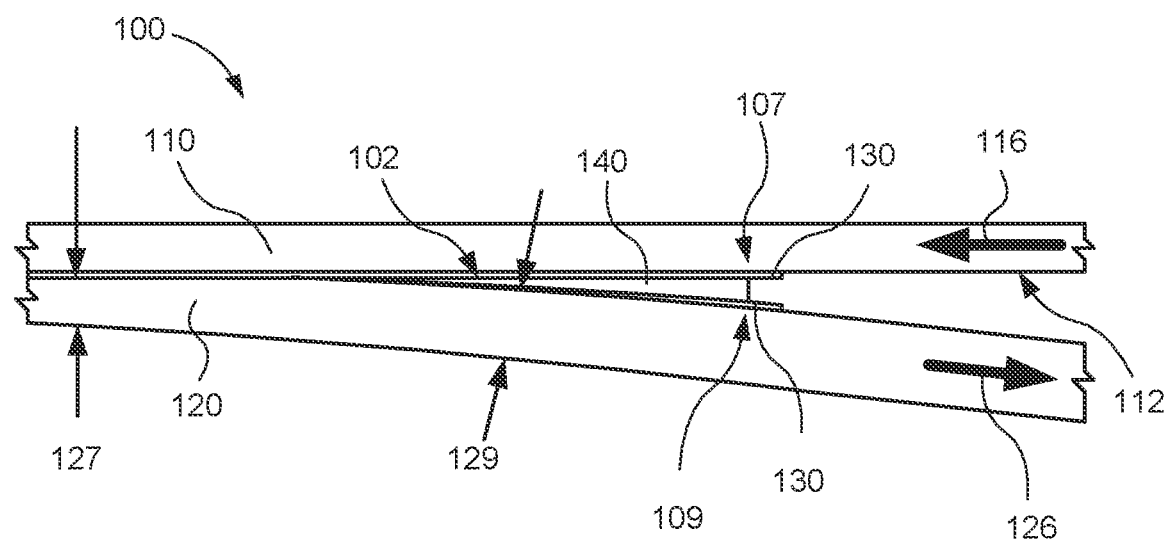
FIG. 4 is a cross-sectional view of a y-joint between a tank and a tank skirt, according to one or more embodiments of the present disclosure.

Referring now to FIG. 4, according to some examples of the present disclosure, a cross-sectional view of a structure 100, including a y-joint 102 between a tank 120 and a tank skirt 110, is shown. In some embodiments, the tank 120 is a vessel with an outer cylindrical surface 122 and one or two domed ends 124 (see, for example, FIG. 5). The length of the tank 120 may vary as is shown in the varying sized tanks 120, and corresponding tank skirts 110, depicted in FIGS. 2 and 3. In some embodiments, the tanks 120 include two domed ends 124 and will, in conjunction with one or more tank skirts 110, form annular or continuous y-joints 102.

As has been described herein, in some embodiments, the tank 120 forms part of a spacecraft or a launch vehicle and is subject to cryogenic or other extreme space or launch conditions. In some embodiments, the tank 120 is made of a composite material, which, as used herein, includes fiber reinforced polymer materials. The tank 120 may be a pressurized tank and may be referred to as a pressurized vessel or pressure vessel. In some embodiments, the tank 120 houses a combustible material, such as liquid oxygen, liquid hydrogen, liquid methane, or other fuels under pressure.

The structure 100 includes a tank skirt 110 coupled to the tank 120. The tank skirt 110 includes an inner cylindrical surface 112 that couples to the outer cylindrical surface 122 of the tank 120. The tank skirt 110, in some embodiments, is made of a composite material, which can be the same as or different than the composite material of the tank 120. The tank skirt 110 may form a structural part of an aircraft, a spacecraft, or part of a rocket or launch vehicle (see, generally, FIGS. 2 and 3). The tank skirt 110 is bonded to or otherwise integrated (e.g., co-formed) with the tank 120.

As the tank 120 transitions from the outer cylindrical surface 122 to the domed end 124, the tank 120 and the tank skirt 110 form a y-joint 102 where the wall of the tank 120 diverges from the wall of the tank skirt 110. Accordingly, the wall of the tank 120 and the wall of the tank skirt 110 form two opposite sides of the y-joint 102. The y-joint 122 extends continuously around a circumference of the tank 120 and may generally be considered to define a space, having a substantially triangular cross-sectional shape along a plane parallel to a central axis of the tank 120, between the tank 120 and the tank skirt 110. Stress concentrations at and near the y-joint 102 should be accounted for to ensure the tank 120 and the tank skirt 110 are structurally sound. The embodiments of the present disclosure account for such stress concentrations without excessive cost and weight and enable the design and manufacturing of composite y-joints without the need for experimental verification of the structural properties.

According to one embodiment, shown in FIG. 4, the stress concentrations are accounted for with a wedge structure 140 positioned between the tank 120 and the tank skirt 110. The wedge structure 140 extends annularly or continuously around a circumference of the tank 120 within the space defined by the y-joint 102. The wedge structure 140, in some embodiments, is made of a composite material. In some embodiments, the wedge structure 140 is constructed of the same material as the tank 120 or a same composite material family. However, in some implementations, notwithstanding material being the same, it may be in a different form compared to that of the tank 120. For example, the tank 120 may be constructed of a tape and the wedge structure may be constructed of a fabric both from the same constituents (matrix and fiber). Composite material "families" have the same basic constituents, fiber and matrix, but different forms may be created (tape, fabric, and other slight variations such as slit tape that may only be ⅛" wide versus wide tape that may be 2" wide) which allow for different manufacturing processes (hand layup, automated tape placement, fiber placement, etc). Each composite in the family is made from the same or similar constituents and the forms are compatible with one another such that they can be used together, e.g. you can put a cloth ply with a tape ply in a laminate.

In some embodiments, the size of the wedge structure 140 may be much smaller than that of a softening strip 18, such as the one shown in FIG. 1. The dimensions of the wedge structure can be on the order of only one-fifth that of the dimensions of a softening strip.

In some embodiments, a stiffness of the wall of the tank 120 and/or the tank skirt 110 and the wedge structure 140 is substantially the same. As used herein, in the context of stiffness, substantially the same means falls in the same range or in the same order of magnitude. For instance the stiffness of the tank wall may be 5 msi (1 million pounds per square inch) in the axial direction and 10 msi in hoop direction; whereas the stiffness of the wedge structure 140 may be 7 msi in both directions. Generally, the stiffness of the tank 120 and the wedge structure 140 is between 5 msi and 10 msi, in some examples. In another particular example, the stiffness of the tank 120 is 6.6 msi in the axial direction, 8.18 msi in the hoop direction, and the stiffness of the wedge structure 140 is 6.5 msi. The stiffness of the wedge structure 140, being substantially the same as the tank 120 and/or the tank skirt 110, allows the wedge structure 140 to be formed of a material similar to that of the tank 120 and/or the tank skirt 110, which allows for the use of cheaper materials than those used for specialized cryogenic softening strips. In contrast, softening strips such as described in FIG. 1 have stiffness values that are orders of magnitude lower than the tank, e.g. 0.1 msi.

The wedge structure 140 may be bonded to both the tank 120 and the tank skirt 110 by an adhesive 130. The size of the adhesive 130 in FIG. 4 is exaggerated and not necessarily to scale for clarity in showing the adhesive 130. The adhesive 130 may be a glue or a film adhesive. In some embodiments, the adhesive 130 extends beyond the ends of the wedge structure 140 as depicted. The adhesive 130 may extend beyond the end of the wedge structure 140 at the open end of the y-joint 102 as well as at the closed end of the y-joint 102 (or what is sometimes referred to as the crotch) such that the adhesive 130 also, at least partially, adheres the tank skirt 110 directly to the outer cylindrical surface 122 of the tank 120. The crotch may be filled with additional adhesive 130 to ensure no separation between the tank 120 and the tank skirt 110 occurs where the wedge structure 140 ends.

In addition to the wedge structure 140, a reduction in stress concentrations is facilitated by a tapered wall thickness of the tank 120. The wall thickness of the tank 120 increases at the y-joint 102. As depicted, a wall thickness 127 of the wall defining the cylindrical surface 122 of the tank 120 increases to a wall thickness 129 of the wall defining the domed end 124. Accordingly, the wall thickness 129 of the tank 120 is greater at the y-joint 102 than at the cylindrical surface 122. The wall thickness may again taper or decrease away from the y-joint 102 toward a point of the domed end 124, such that the wall thickness of the domed end 124 away from the y-joint 102 is the same as or considerably less than the wall thickness of the wall defining cylindrical surface 122. The tapering of the wall thickness at the y-joint 102 allows for the tank 120, wedge structure 140, and the tank skirt 110 to be structurally sound at locations 107, 109 where stress concentrations are susceptible to occur. Without the presence of the wedge, there would be detrimental stress concentration at 102. But, with the wedge, the stress concentration is divided between points 107 and 109. Those stress concentrations are further minimized by tapering the wall thickness. The thickness of the tank wall and the size (e.g., height and length) of the wedge structure 140 can be optimized or concurrently sized depending on the application conditions of the structure 100.

The tank 120 may be constructed by lay-up of plies to create the thickness of the tank walls and the tapering occurs with the increase in plies at the y-joint 102. The ply drop-off ratio may vary depending on the application conditions of the structure 100 but, in some embodiments, the ply drop-off ratio of the tank lay-up should not be less than 30:1.

In some embodiments, the tapering occurs at the y-joint 102. In some embodiments, the tapering occurs beyond each side of the y-joint 102 such that the greater thickness extends beyond the y-joint 102.

As depicted in FIG. 4, the tank wall thickness tapers while the tank skirt wall thickness remains constant. However, in other embodiments, the tank skirt wall defining the y-joint 102 tapers in thickness. That is, the wall thickness of the wall of the tank skirt 110 tapers with a greater thickness at the y-joint 102 and with the wall thickness of the tank 120 remaining constant. Either side of the y-joint 102 may taper in thickness depending on the application conditions. In some embodiments, the wall thickness of the tank 120 and the tank skirt 110 defining both sides of the y-joint 102 may taper. That is, both the tank wall and the tank skirt wall may taper in thickness with a greater thickness of the walls being at the y-joint 102.

Depending on the application, various forces or loads may be exerted on the structure 100. FIG. 4 depicts a skirt load 116 opposite a tank dome load 126. The varying loads will contribute to the stress concentrations 107, 109 at the y-joint 102 and will factor into to the sizing requirements for the wall thickness tapering and the wedge structure 140.

The tapering of the thickness allows for the gradual sharing of the loads between the tank 120 and the tank skirt 110 by maintaining adequate thickness on at least one side of the y-joint 102 or both sides of the y-joint 102.

Figure 5:
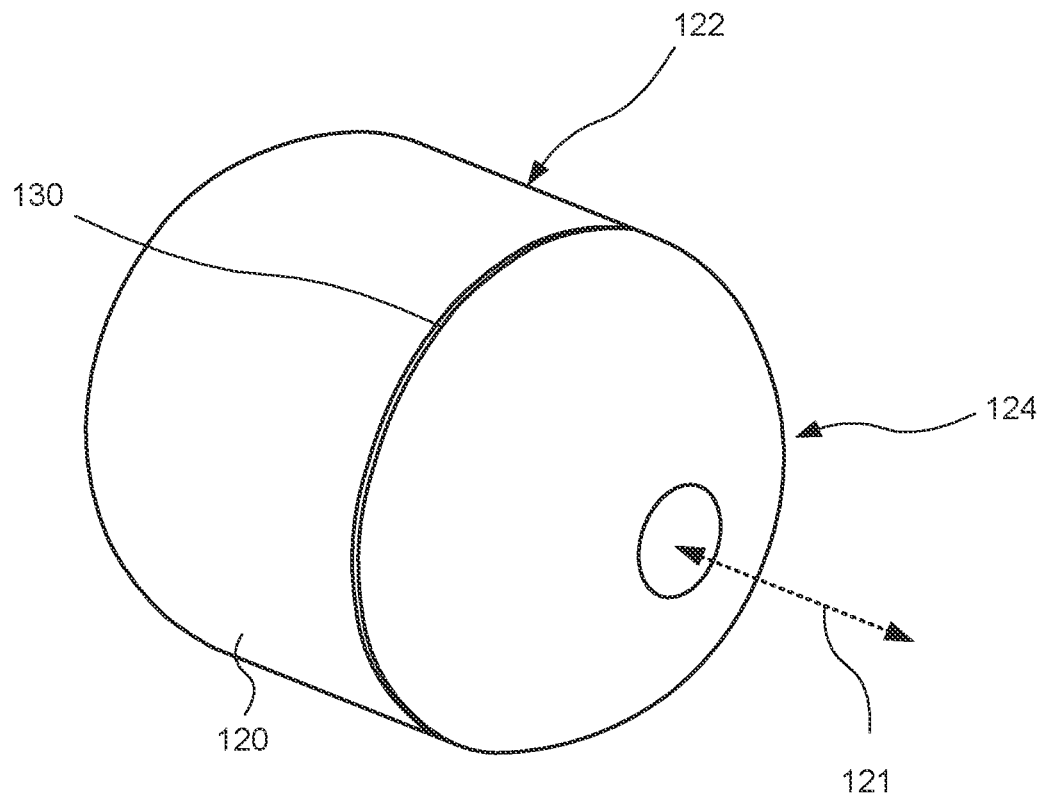
FIG. 5 is a perspective view of a pressurized tank, according to one or more embodiments of the present disclosure.

Referring now to FIG. 5, a perspective view of a tank 120 is shown. The tank 120 includes an outer cylindrical surface 122 and a domed end 124. Also depicted is an adhesive 130 which is placed around the circumference of the tank 120. The adhesive 130 extends onto the outer cylindrical surface 122 and onto the domed end 124 a length greater than where the wedge structure will be placed. FIG. 5 further depicts the axial direction 121 of the tank 120.

Figure 6:
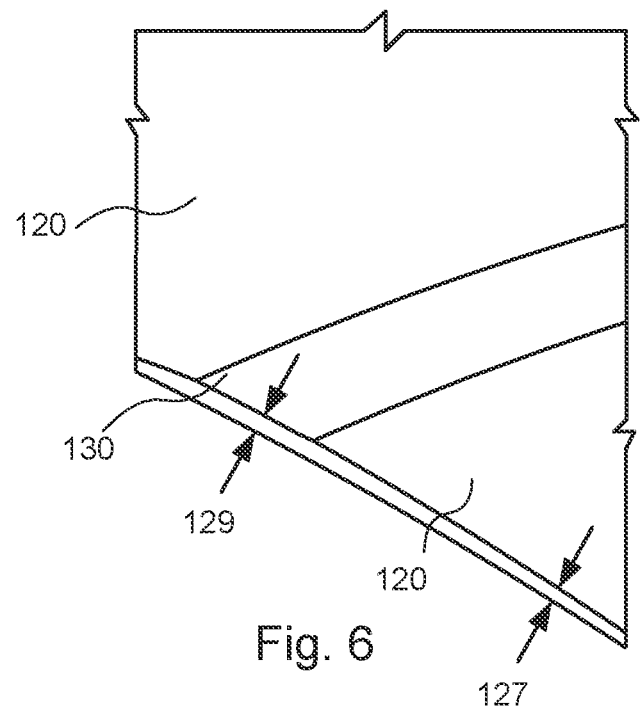
FIG. 6 is a close-up perspective view of a pressurized tank, according to one or more embodiments of the present disclosure.

Referring now to FIG. 6, a close-up view of the tank 120 and adhesive 130 are shown. FIG. 6 further depicts a cross section of the tank wall. As discussed in other embodiments, the thickness of the tank wall tapers with a greater thickness at the area of the y-joint (depicted by arrows 129) than the thickness nearer the top of the domed end (depicted by arrows 127). Referring still to FIG. 6, tank 120, in some embodiments, is cured prior to laying the adhesive 130.

Figure 7:
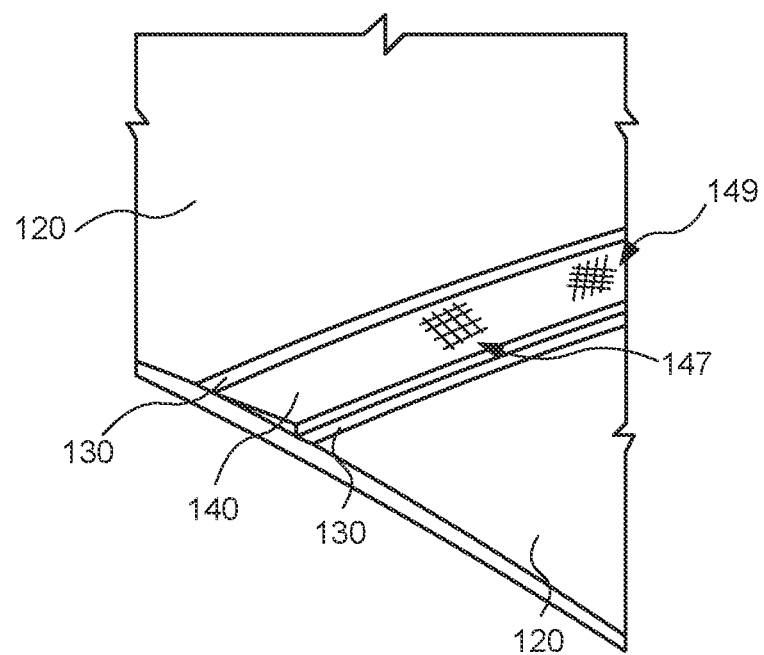
FIG. 7 is a close-up perspective view of a pressurized tank, according to one or more embodiments of the present disclosure.

Referring to FIG. 7, the wedge structure 140 is then laid up on the adhesive 130 around the circumference of the tank 120. The wedge structure 140 may be formed as depicted generally in FIG. 11, with fabric plies 142 of varying length allowing for a generally triangle shape to emerge. The length 144 of the wedge structure 140 and the height 146 of the wedge structure can be tailored depending on the need.

Figure 11:
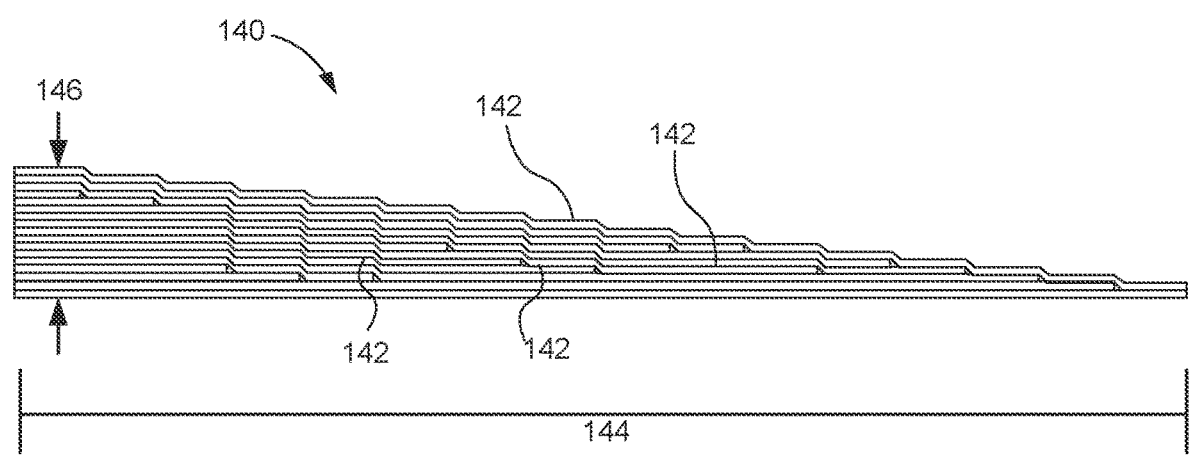
FIG. 11 is a cross-sectional side view of a wedge structure, according to one or more embodiments of the present disclosure.

In some embodiments, the plies are fabric plies 142. In other embodiments, the plies may be tape plies. Referring to FIG. 11, each fabric ply layer may be oriented in a different direction than the fabric ply layer above and/or below. Referring to FIG. 7, an orientation of the fabric ply at zero degrees relative to the axial direction of the tank is shown generally at 147. An orientation of the fabric ply at forty-five degrees relative to the axial direction of the tank is shown generally at 149.

The orientation of the fabric plies 142 may be adjusted at any angle including angles between the two shown in FIG. 7. In some embodiments, the fabric ply 142 nearest the adhesive layer 130 may be generally laid up at forty-five degrees. Testing indicates that such an orientation reduces the bonded interface stiffness in the load direction (which may be parallel to the axial direction 121).

In some embodiments, a lay-up of the wedge structure 140 is a constructed such that a first fabric ply 142 of the wedge structure 140 is oriented in a different direction to a second fabric ply 142 adjacent to the first fabric ply 142. In some embodiments, the orientation of the individual fabric plies 142 of the wedge structure 140 are laid up in an alternating or sequenced pattern, varying from forty-five degrees relative to the axial direction 121 of the tank 120 to zero degrees relative to the axial direction 121 of the tank 120. In some implementation, the orientations may alternate between two orientations.

In other implementations, the orientations may vary in a predetermined sequence of orientations. For example, in some implementations, the orientation of the fabric plies 142 may be sequenced such that two-thirds of the fabric plies are oriented at forty-five degrees and one-third of the fabric plies are oriented at zero degrees.

Referring again to FIG. 7, after the lay-up of the wedge structure 140, the wedge structure 140 is cured to form a composite material. In some embodiments, the wedge structure 140 is a same material as the tank 120. In some embodiments, the wedge structure 140 is a similar material as the tank 120. In some embodiments, they are the same material in a different form, where the tank 120 is constructed of a tape and the wedge structure 140 is constructed of a fabric.

Figure 8:
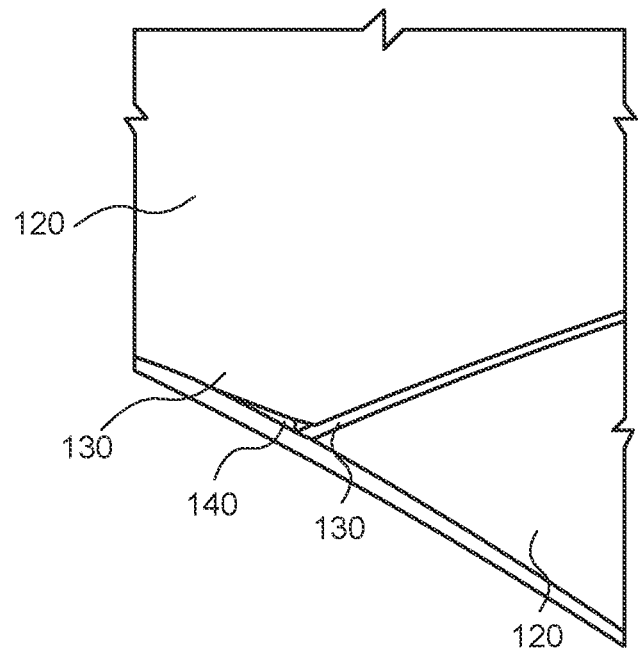
FIG. 8 is a close-up perspective view of a pressurized tank, according to one or more embodiments of the present disclosure.

Referring now to FIG. 8, an adhesive 130 is applied to the wedge structure 140 and extending beyond to the outer cylindrical surface of the tank 120. The adhesive 130 will be used to bond the wedge structure 140 to the tank skirt 110 as well as to bond the outer cylindrical surface of the tank 120 to the tank skirt 110.

Figure 9:
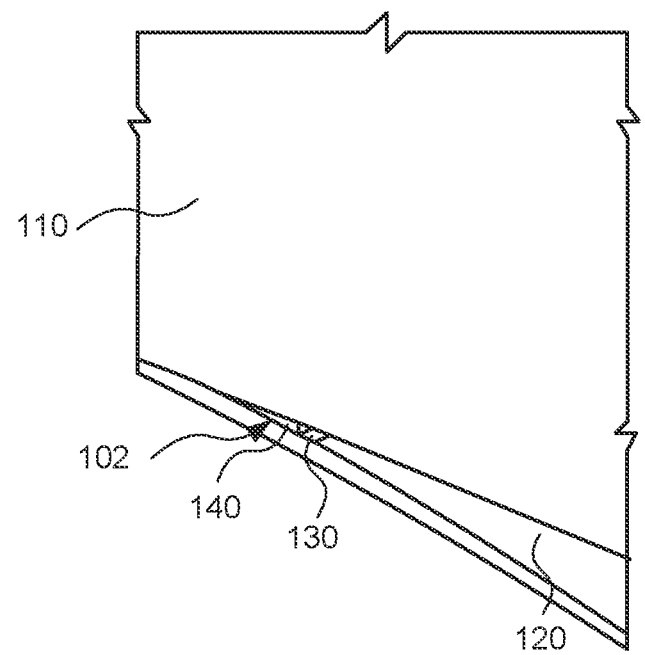
FIG. 9 is a close-up perspective view of a pressurized tank and tank skirt, according to one or more embodiments of the present disclosure.
Figure 10:
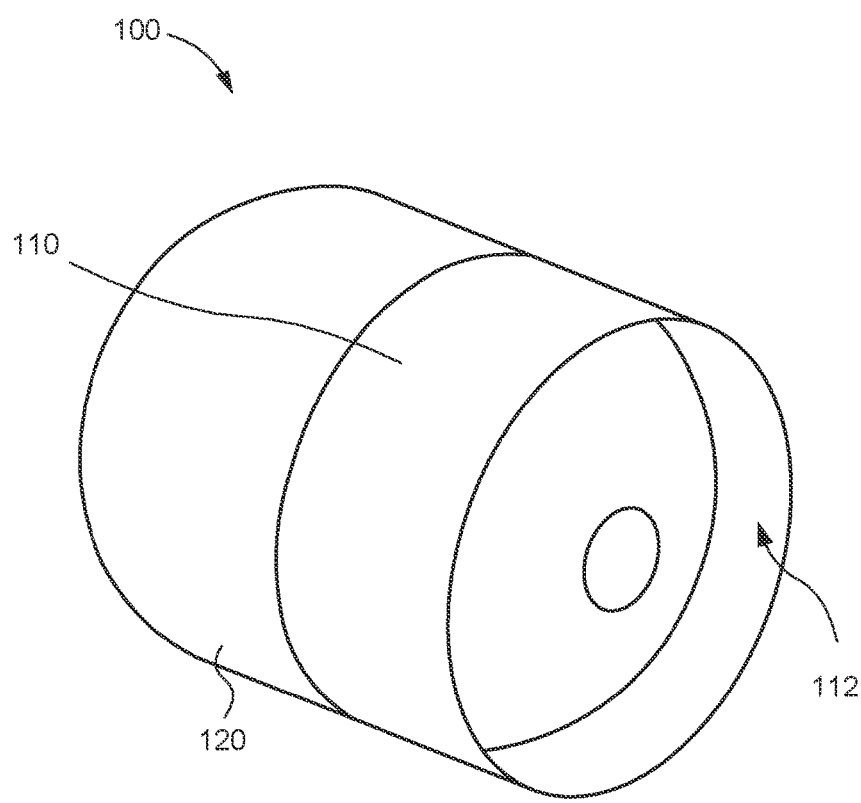
FIG. 10 is a perspective view of a pressurized tank and tank skirt, according to one or more embodiments of the present disclosure.

Referring now to FIG. 9, the tank skirt 110 is laid up over the adhesive 130 and wedge structure 140. The tank skirt 110 extends beyond the wedge structure 140 and forms one side of the y-joint 102. Referring to FIG. 10, a perspective view of the tank 120 and tank skirt 110 is shown. As shown, the tank skirt 110 only extends beyond the one domed end 124 of the tank 120. In some embodiments, the tank skirt 110 may extend beyond both domed ends 124 of the tank 120 such that there are two y-joints 102 formed between the tank 120 and the tank skirt 110, one on each domed end 124 of the tank 120.

Embodiments disclosed herein utilize a third member, the wedge structure 140, at the junction between two load carrying walls, the tank 120 and the tank skirt 110. The size and lay-up of the wedge structure 140 may be optimized in conjunction with the thickness of the adjacent walls to make the joint work. Such embodiments do not require the use of special materials. The stiffness of the wedge structure 140 can be manufactured from composite material layers of the same or very similar layers as the two primary adjoining walls of the structural joint. The use of material similar to that of the adjoining walls results in similar coefficient of thermal expansion which helps to avoid the development of detrimental stresses due to thermal contraction/expansion. Any stiffness tailoring of the wedge structure 140 can be achieved by the appropriate layer orientation and the size and shape of the wedge structure 140. The stiffness of the wedge structure 140 is comparable to the adjoining walls such that it also carries significant load and therefore performs the function of transforming the one high stress concentration to two stress concentrations of lower intensity.

In addition to the introduction of the wedge structure 140 of a similar material, embodiments described herein may achieve the proper load sharing between the two load carrying walls by gradually increasing and/or decreasing the thickness of one wall versus the other such that, at the point where the two walls are joined, the load sharing is at a ratio that is not detrimental to the joint.

Figure 12:
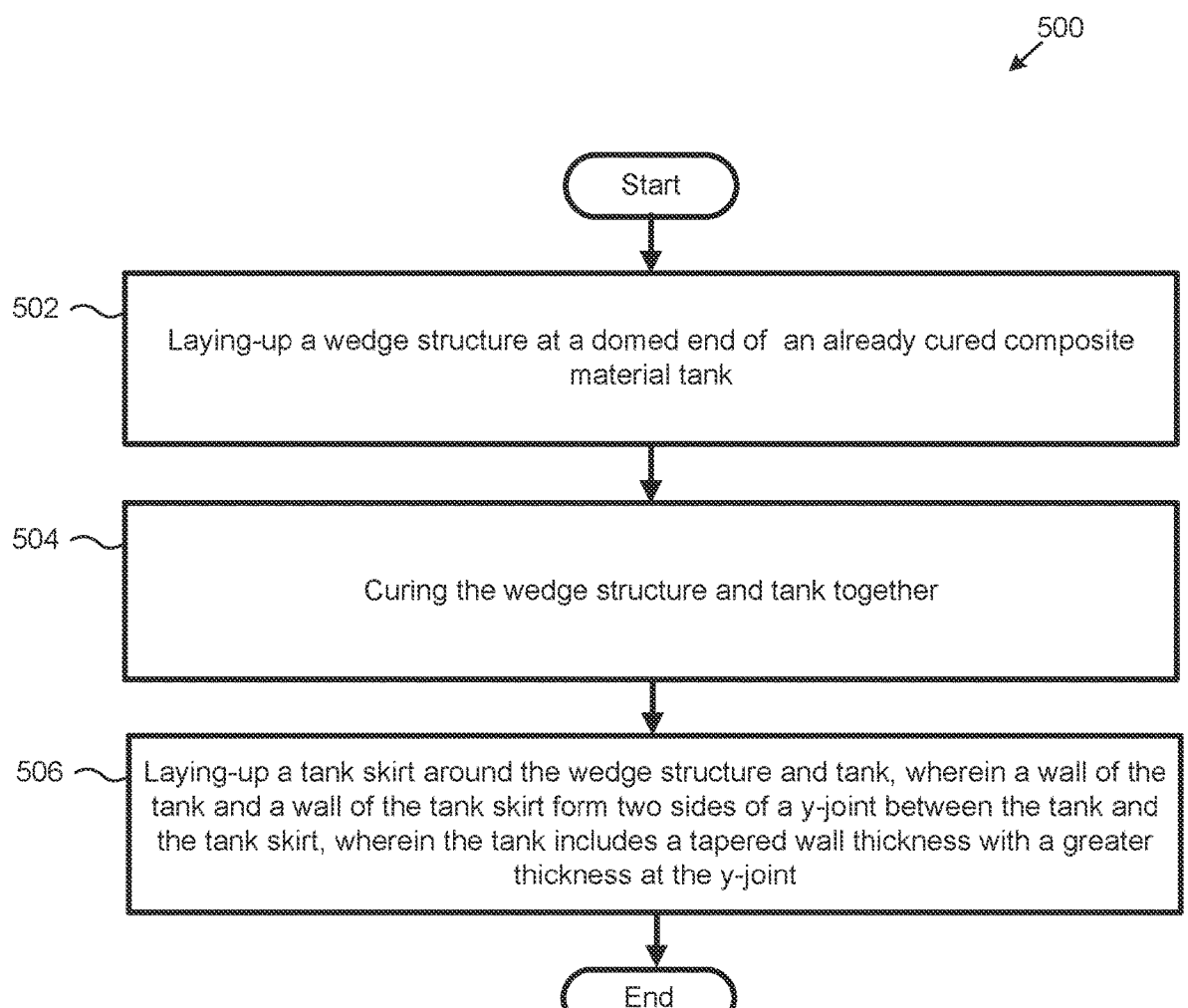
FIG. 12 is a schematic flow diagram of a method, according to one or more embodiments of the present disclosure.

Now referring to FIG. 12, one embodiment of a method 500 is shown. The method 500 includes laying-up 502 a wedge structure at a domed end of an already cured composite material tank. At 504, the method 500 includes curing the wedge structure. The method further includes laying-up a tank skirt around the wedge structure and tank at 506, wherein a wall of the tank and a wall of the tank skirt form two sides of a y-joint between the tank and the tank skirt. The tank includes a tapered wall thickness with a greater thickness at the y-joint. The method then ends.

In some embodiments, the method may further include concurrently sizing a length and a height of the wedge structure along with the thickness of the tank at the y-joint. Depending on the parameters of use of the structure, the size of the wedge structure as well as the taper ratio of the tank wall or the tank skirt wall can be optimized while minimizing the amount of material needed and the overall weight of the structure. Considerations may include the pressure in the tank and the ambient pressures on the tank skirt.

In some embodiments, the method may include laying an adhesive layer on the tank prior to laying-up the wedge structure. In some embodiments, the laying-up the wedge structure includes laying-up fabric plies. The fabric plies may include an orientation. In some embodiments, the orientation of the fabric ply adjacent to the adhesive layer is angled relative to the axial direction of the tank. In some implementations, the orientation of the fabric ply adjacent to the adhesive layer is forty-five degrees relative to the axial direction of the tank. In some embodiments, the orientation of the fabric ply adjacent to the adhesive layer is between five degrees and eighty-five degrees relative to the axial direction of the tank. The angled fabric plies at the bonded interface between the wedge structure and the tank reduces the bonded interface stiffness in the load direction.

In some embodiments, the orientation of the individual fabric plies of the wedge structure are laid up in an alternating or sequenced pattern, varying from forty-five degrees relative to the axial direction of the tank to zero degrees relative to the axial direction of the tank. The orientations may alternate, in some implementations. In other implementations, the orientations may vary in another predetermined sequence.

In some embodiments, the method may include laying-up the tank skirt around the wedge structure and the tank further includes tapering a wall thickness of the tank skirt with a greater thickness at the y-joint.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of integrating a wall skirt and a tank, each made of composite materials, the method comprising:
   laying-up a wedge structure at a tapered thickness portion of a domed end of the tank after the tank has been cured, wherein the wedge structure includes a plurality of composite fabric plies;
   curing the wedge structure after being laid-up at the domed end of the tank; and
   laying-up a tank skirt around the wedge structure and the tank, after curing the wedge structure, such that a wall of the tank and a wall of the tank skirt form two sides of a y-joint between the tank and the tank skirt within which the wedge structure is located.

2. The method according to claim 1, wherein the step of laying-up the wedge structure comprises orienting a first fabric ply of the plurality of composite fabric plies in a different direction than a second fabric ply of the plurality of composite fabric plies that is adjacent to the first fabric ply.

3. The method according to claim 1, wherein a fabric ply of the wedge structure nearest the tank is oriented forty-five degrees relative to an axial direction of the tank.

4. The method according to claim 1, wherein laying-up the tank skirt around the wedge structure and the tank further comprises tapering a thickness of the tank skirt such that the thickness of the tank skirt is greater at the y-joint than away from the y-joint.

5. The method according to claim 1, further comprising laying an adhesive layer on the tank before laying-up the wedge structure, wherein at least a portion of the wedge structure is laid up on the adhesive layer.

6. The method according to claim 5, wherein the adhesive layer is laid on the tank such that a portion of the adhesive layer extends beyond the wedge structure.

7. The method according to claim 1, further comprising laying an adhesive layer on the wedge structure, after curing the wedge structure, wherein a portion of the tank skirt is laid up on the adhesive layer.

8. The method according to claim 1, further comprising:
   laying an adhesive layer on the tank before laying-up the wedge structure, wherein at least a portion of the wedge structure is laid up on the adhesive layer; and
   laying a second adhesive layer on the wedge structure, after curing the wedge structure, wherein a portion of the tank skirt is laid up on the second adhesive layer.

9. The method according to claim 1, further comprising adhering the tank skirt directly to the tank via at least one of the adhesive layer or the second adhesive layer.

10. The method according to claim 9, further comprising interposing a third adhesive layer between the tank skirt and the tank such that the tank skirt is further adhered directly to the tank via the third adhesive layer.

11. The method according to claim 1, wherein a fabric ply of the wedge structure nearest the tank is angled relative to an axial direction of the tank.

12. The method according to claim 1, wherein a fabric ply of the wedge structure nearest the tank is oriented between five degrees and eighty-five degrees relative to an axial direction of the tank.

13. The method according to claim 1, wherein laying-up the wedge structure comprises laying-up the plurality of fabric plies in an alternating pattern.

14. The method according to claim 13, wherein laying-up the plurality of fabric plies in the alternating pattern comprises alternating an orientation of each one of the plurality of fabric plies relative to each adjacent one of the plurality of fabric plies.

15. The method according to claim 13, wherein laying-up the plurality of fabric plies in the alternating pattern comprises varying an orientation of the plurality of fabric plies from zero degrees, relative to an axial direction of the tank, to forty-five degrees, relative to the axial direction of the tank.

16. The method according to claim 1, further comprising:
   laying-up the domed end of the tank before the tank is cured such that a thickness of the domed end of the tank is greater at the y-joint than away from the y-joint; and
   curing domed end of the tank.

17. The method according to claim 1, wherein:
   the wedge structure comprises a first ply, comprising first fibers, and a second ply, comprising second fibers; and
   laying-up the wedge structure comprises orienting the second ply relative to the first ply such that the second fibers of the second ply are oriented in a different direction than the first fibers of the first ply.

18. The method according to claim 17, wherein laying-up the tank skirt comprises laying-up a plurality of third plies.

19. The method according to claim 18, further comprising:
   laying-up a plurality of fourth plies to form the domed end of the tank; and
   curing the domed end of the tank.

20. The method according to claim 1, wherein the tank comprises a plurality of plies made of tape.

* * * * *